(12) United States Patent
Zeng et al.

(10) Patent No.: US 11,465,911 B2
(45) Date of Patent: Oct. 11, 2022

(54) METHOD FOR PREPARING CERAMIC MATERIAL

(71) Applicants: Chongqing Institute of East China Normal University, Chongqing (CN); East China Normal University, Shanghai (CN)

(72) Inventors: Heping Zeng, Chongqing (CN); Yanwei Huang, Chongqing (CN); Jiayang He, Chongqing (CN)

(73) Assignees: CHONGQING INSTITUTE OF EAST CHINA NORMAL UNIVERSITY, Chongqing (CN); EAST CHINA NORMAL UNIVERSITY, Shanghai (CN)

( * ) Notice: Subject to any disclaimer, the term of this patent is extended or adjusted under 35 U.S.C. 154(b) by 391 days.

(21) Appl. No.: 16/892,581

(22) Filed: Jun. 4, 2020

(65) Prior Publication Data

US 2021/0032120 A1 Feb. 4, 2021

(30) Foreign Application Priority Data

Jul. 30, 2019 (CN) .......................... 201910696756.7
Jul. 30, 2019 (CN) .......................... 201910696758.6
Jul. 30, 2019 (CN) .......................... 201910699539.3

(51) Int. Cl.
*C01G 25/00* (2006.01)
*H01M 8/1253* (2016.01)
*C01B 33/20* (2006.01)

(52) U.S. Cl.
CPC ............ *C01G 25/006* (2013.01); *C01B 33/20* (2013.01); *H01M 8/1253* (2013.01);
(Continued)

(58) Field of Classification Search
CPC ..... C01G 25/006; C01B 33/20; H01M 8/1253
See application file for complete search history.

(56) References Cited

FOREIGN PATENT DOCUMENTS

| CN | 103113106 | 5/2013 |
| CN | 109851377 | 6/2019 |

OTHER PUBLICATIONS

Yamamura et al., "Relationship between oxide-ion conductivity and dielectric relaxation in the Ln2Zr2O7 system having pyrochore-type compositions (Ln = Yb, Y, Gd, Eu, Sm, Nd, La)," Journal of Physics and Chemistry of Solids, 2008, vol. 69, pp. 1711-1717.
(Continued)

*Primary Examiner* — James A Fiorito
(74) *Attorney, Agent, or Firm* — Hodgson Russ LLP

(57) ABSTRACT

Disclosed are a method for preparing a ceramic material including a compound of a formula of $A_2B_xO_y$, and a ceramic material prepared by the method. The method includes: mixing a first oxide of $AO_m$ and a second oxide of $BO_n$ to obtain a mixture, ball-milling the mixture until a particle size of the mixture is not greater than 1 μm with a medium selected from a group consisting of ethanol, acetone, deionized water and a combination thereof, to obtain a powder, drying the powder at a temperature in a range of 60 to 80° C., and sintering the powder with a laser irradiation having a laser wavelength of 980 nm, an irradiation power ranging from 50 to 1500 W and an irradiation period of 3 s to 8 min to obtain the ceramic material.

18 Claims, 7 Drawing Sheets

(52) U.S. Cl.
CPC ...... *C01P 2002/74* (2013.01); *C01P 2002/85* (2013.01); *C01P 2004/03* (2013.01); *C01P 2006/32* (2013.01); *C01P 2006/40* (2013.01)

(56) References Cited

OTHER PUBLICATIONS

Van Duin et al., "Supporting Information for The ReaxFF Reactive Force Field for Solid Oxide Fuel Cell Systems with Application to Oxygen Ion Transport in Yttria-Stabilized Zirconia," Journal of Physics and Chemistry A, 2008, vol. 112, No. 14, 39 pages.

CNIPA, First Office Action for CN Application No. 201910696756.7, dated May 17, 2021.

CNIPA, First Office Action for CN Application No. 201910696758.6, dated Apr. 23, 2021.

CNIPA, First Office Action for CN Application No. 201910699539.3, dated May 19, 2021.

US 11,465,911 B2

METHOD FOR PREPARING CERAMIC MATERIAL

CROSS-REFERENCE TO RELATED APPLICATION

This application claims priority to and benefits of Chinese Patent Application Nos. 201910696758.6, 201910696756.7 and 201910699539.3, filed on Jul. 30, 2019. The entire contents of the aforementioned applications are incorporated herein by reference.

TECHNICAL FIELD

The present disclosure relates to a field of material processing, and particular to a method for preparing a ceramic material and a ceramic material prepared by the method.

BACKGROUND

In the field of composite material processing, a ceramic material is normally prepared by existing methods such as a reactive calcining method, in which raw materials are mixed and calcined to obtain the ceramic material. However, in the existing method, a complex reaction happens to solid phase components, resulting in unexpected second phases. Meanwhile, during the reaction process, the raw materials are heated to cause a volume expansion, resulting in pores and defects in the prepared material, thus affecting performances, such as thermal conductivity, ionic conductivity and optical property, of the ceramic material.

Therefore, there is still a need for providing a method for preparing a ceramic material with good thermal conductivity, ionic conductivity or optical property.

SUMMARY

The present disclosure seeks to solve at least one of the problems that exist in the related art to at least some extent.

Accordingly, in an aspect, the present disclosure provides in embodiments a method for preparing a ceramic material including a compound of a formula of $A_2B_xO_y$, where A is at least one of Sc, Y, La, Nd, Eu, Gd, Dy, Er, Yb and Lu, B is at least one of Ti, Zr, Ce and Hf, $2 \leq x \leq 10$, $7 \leq y \leq 20$, and $0 \leq y/x \leq 3.5$. The method includes: mixing a first oxide of $AO_m$ and a second oxide of $BO_n$ to obtain a mixture, ball-milling the mixture until a particle size of the mixture is not greater than 1 μm with a medium selected from a group consisting of ethanol, acetone, deionized water and a combination thereof, to obtain a powder, drying the powder at a temperature in a range of 60 to 80° C., and sintering the powder with a laser irradiation having a laser wavelength of 980 nm, an irradiation power ranging from 50 to 1500 W, a spot diameter ranging from 10 to 15 mm and an irradiation period of 3 s to 8 min to obtain the ceramic material.

In another aspect, the present disclosure provides in embodiments a ceramic material, including a compound of a formula of $A_2B_xO_y$, where A is at least one of Sc, Y, La, Nd, Eu, Gd, Dy, Er, Yb and Lu, B is at least one of Ti, Zr, Ce and Hf, $2 \leq x \leq 10$, $7 \leq y \leq 20$, and $0 \leq y/x \leq 3.5$, prepared by the method as described above.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

Figure 1:
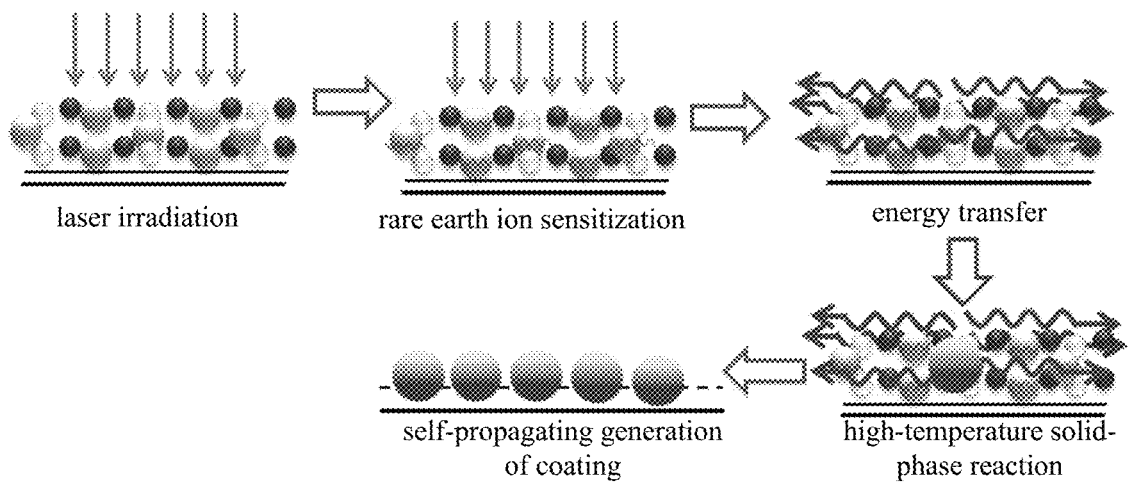
FIG. 1 is a schematic diagram showing a reaction principle of a ceramic material according to an embodiment of the present disclosure.

Embodiments of the present disclosure are described in detail below, examples of which are illustrated in the drawings. The embodiments described herein with reference to drawings are explanatory, and used to generally understand the present disclosure. The embodiments shall not be construed to limit the present disclosure.

The present disclosure provides in embodiments a method for preparing a ceramic material and a ceramic material prepared by the method.

In an aspect, the present disclosure provides in embodiments the method for preparing a ceramic material including a compound of a formula of $A_2B_xO_y$, where A is at least one of Sc, Y, La, Nd, Eu, Gd, Dy, Er, Yb and Lu, B is at least one of Ti, Zr, Ce and Hf, $2 \leq x \leq 10$, $7 \leq y \leq 20$, and $0 \leq y/x \leq 3.5$. The method includes: mixing a first oxide of $AO_m$ and a second oxide of $BO_n$ to obtain a mixture, ball-milling the mixture until a particle size of the mixture is not greater than 1 μm with a medium selected from a group consisting of ethanol, acetone, deionized water and a combination thereof, to obtain a powder, drying the powder at a temperature in a range of 60 to 80° C., and sintering the powder with a laser irradiation having a laser wavelength of 980 nm, an irradiation power ranging from 50 to 1500 W, a spot diameter ranging from 10 to 15 mm and an irradiation period of 3 s to 8 min to obtain the ceramic material.

In an embodiment of the present disclosure, the ball-milling is performed at a ball-milling speed of 400 rpm for a period ranging from 8 to 24 h.

In an embodiment of the present disclosure, after the powder is obtained, the method further includes a granulation process. The granulation process includes: preparing an aqueous binder solution being of 1 to 10% of a binder by mass, dividing the aqueous binder solution into 2 or 3 parts to be added into the powder separately, milling for 3 to 6 h, and sieving with a 20 to 500 mesh screen.

In an embodiment of the present disclosure, the milling includes manual grinding or ball-milling.

In an embodiment of the present disclosure, the binder includes at least one of polyvinyl alcohol, methoxysilane, polyurethane and silicone.

In an embodiment of the present disclosure, the method further includes: removing the binder by heating or laser irradiation.

In an embodiment of the present disclosure, the heating is performed at a heating rate ranging from 1 to 5° C./min to a temperature in a range of 300 to 600° C., and the temperature is maintained for 10 to 24 h.

In an embodiment of the present disclosure, the laser irradiation for removing the binder has a power not greater than 30 W, a spot diameter ranging from 10 to 15 mm and an irradiation period ranging from 5 to 20 min.

In an embodiment of the present disclosure, the method further includes: compacting the powder by a hydraulic process or an isostatic pressing process.

In an embodiment of the present disclosure, the hydraulic process has a pressure ranging from 2 and 15 MPa and a compacting time ranging from 3 to 10 s.

In an embodiment of the present disclosure, the isostatic pressing process has an isostatic pressure ranging from 100 to 300 MPa and a compacting time of 1 to 10 min.

In an embodiment of the present disclosure, a molar ratio of the first oxide of $AO_m$ to the second oxide of $BO_n$ is in a range of 1:1 to 1:5.

In an embodiment of the present disclosure, the ceramic material includes a further compound different from the compound of the formula of $A_2B_xO_y$.

In an embodiment of the present disclosure, the further compound has a mass of 0.5 to 30 wt % based on a total weight of the first oxide of $AO_m$ and the second oxide of $BO_n$.

In an embodiment of the present disclosure, the further compound is $SiO_2$, and $SiO_2$ is mixed with other raw materials.

In an embodiment of the present disclosure, the further compound is LiF, and LiF is mixed with other raw materials.

In an embodiment of the present disclosure, the powder has a diameter distribution in a range of 10 nm to 1 μm.

In an embodiment of the present disclosure, before the laser irradiation, the powder is applied on a substrate.

In another aspect, the present disclosure provides in embodiments a ceramic material, including a compound of a formula of $A_2B_xO_y$, where A is at least one of Sc, Y, La, Nd, Eu, Gd, Dy, Er, Yb and Lu, B is at least one of Ti, Zr, Ce and Hf, $2 \leq x \leq 10$, $7 \leq y \leq 20$, and $0 \leq y/x \leq 3.5$, prepared by the method as described above.

In an embodiment of the present disclosure, another compound such as $SiO_2$ or LiF may be mixed with the other raw materials to form the ceramic material, to further adjust the properties of the ceramic material.

It should be understood that the detail features and advantages in the above embodiments of the method for preparing a ceramic material are also applicable to the embodiments of the ceramic material, and will not be described here again.

With the method provided in the embodiments of the present disclosure, the prepared ceramic material is stable, and has excellent thermal conductivity, optical property and/or ionic conductivity, which can be used in different applications, such as a thermal barrier coating, a transparent material and a solid electrolyte.

In some embodiments of the present disclosure, the ceramic material has a low thermal conductivity and may be used as a thermal barrier coating.

The thermal barrier coating is a coating of a ceramic material with a good heat resistance, a low thermal conductivity and a good corrosion resistance that is applied on a surface of a workpiece by an electron beam physical vapor deposition or a plasma spraying, so as to reduce a surface temperature of the workpiece at a high temperature. For example, the thermal barrier coating may be applied to turbine blades of a gas engine, which may significantly reduce the working temperature of the blade alloy, thus greatly improving the life and reliability of the engine.

In the present disclosure, the ceramic material of the present disclosure may be coated on a substrate by the laser technology. The formation of the thermal barrier coating on the substrate may be controlled by adjusting the input energy of the laser. The thermal barrier coating materials may be different in composition, but all include at least one rare earth element. The material placed on the substrate is irradiated with laser to activate rare earth ions to produce high energy to catalyze reactants. Moreover, the material may be melt with a thin surface layer of the substrate together, and both of them may be rapidly solidified to form a coating in metallurgical bonding to the substrate. The laser energy is supplied continuously to activate more rare earth ions to realize ion sensitization and to realize a multi-step cascade reaction, such that the thermal barrier coating may be generated on the substrate in a self-propagating manner, thus improving the wear resistance, corrosion resistance, heat resistance and oxidation resistance of the surface of the substrate.

In the present disclosure, various characteristics such as coating size, thickness, crystallinity, lattice type and lattice size of the thermal barrier coating of the present disclosure may be controlled by adjusting parameters such as laser power, irradiation period and area of the laser. With the method for preparing the ceramic material of the present disclosure, advantages of less complexity in operation and device, less environmental requirements, short synthesis period, high raw material utilization rate, and less or no by-products may be realized. Therefore, the present method may be applied in large-scale industrial production for preparing high-performance thermal barrier coating materials.

In some embodiments of the present disclosure, the prepared ceramic material has a high transmittance and may be used to prepare a transparent ceramic product.

As described above, the ceramic material prepared by the existing method may have impurities that absorb light and pores that cause light scattering, and it is difficult to be transparent. With the method for preparing the ceramic material of the present disclosure, the raw materials are sintered to absorb the laser input energy to catalyze the reaction to obtain the zirconia-based transparent ceramic material. The product obtained from the laser-catalyzed high-temperature condition is dense and has a high transmittance. The preparation method is easy to operate, timesaving, material-saving, clean and pollution-free, and thus may be applied in a large scale (i.e., industrial scale). The ceramic material obtained has a high transmittance of equal to or more than 80%, and also exhibits good corrosion resistance, wear resistance and thermal insulation performances.

In a further embodiment of the present disclosure, the prepared ceramic material has good ion conductivity and may be used as a solid electrolyte for a solid oxide fuel cell.

In the present disclosure, the first oxide of $AO_m$ and the second oxide of $BO_n$ are mixed to obtain the mixture, the mixture is compacted by the hydraulic process or the isostatic pressing process and placed in a metal crucible or on a substrate that does not chemically react with resultants, and irradiated by the laser. Wavelength, spot diameter, power, period and other parameters of the laser for laser irradiation (sintering) may be adjusted to obtain the ceramic material of $A_2B_xO_y$. With the method of the present disclosure, the laser irradiation/sintering process may heat the material quickly and locally. The solid electrolyte material prepared by this method has a stable structure and a high ionic conductivity, to avoid agglomerate problem existed in traditional ceramic electrolyte. The method for preparing the ceramic material of the present application is easy to operate, pollution-free and has high raw material utilization rate and low energy consumption, and thus may be applied in the large scale.

EXAMPLE 1

Rare earth oxides $Gd_2O_3$ and $Yb_2O_3$, and a Zr element oxide $ZrO_2$ were weighted respectively according to a molar ratio of (Gd+Yb):Zr of 1:1 and a molar ratio of Gd to Yb of 1:4, and mixed by high-energy ball-milling at a ball-milling speed of 400 rpm for 12 hours. Acetone was used as a medium for the ball-milling. After the raw materials were mixed uniformly by the ball-milling, a raw material mixture powder was obtained. The mixture powder was dried in an oven at 75° C. and further milled. A granulation process was performed as follows. An organic colloidal material, polyvinyl alcohol (PVA), was used as a binder solute and deionized water was used as a solvent to form an aqueous binder solution being of 8% of the binder by mass. The solution was divided into 3 parts, and separately added into the mixture powder. After 3-hour milling, the mixture powder was sieved via a 30 mesh screen. Then, the mixture powder was compacted by a hydraulic process at a pressure of 10 MPa for 10 s, and transferred into a furnace to be heated to 500° C. at a heating rate of 5° C./min and kept at this temperature for 12 h to remove the binder. After the mixture powder was cooled to the room temperature, the mixture powder was uniformly covered on an aluminum alloy substrate and was sintered with a laser having a laser wavelength of 980 nm, a laser sintering power of 50 W and a spot diameter of 10 mm. The mixture powder on the aluminum alloy substrate was sintered by the laser for a period of 5 s to activate a self-propagating high-temperature solid-phase reaction, thereby obtaining a ceramic material of $Gd_{0.4}Yb_{1.6}Zr_2O_7$.

Figure 2:
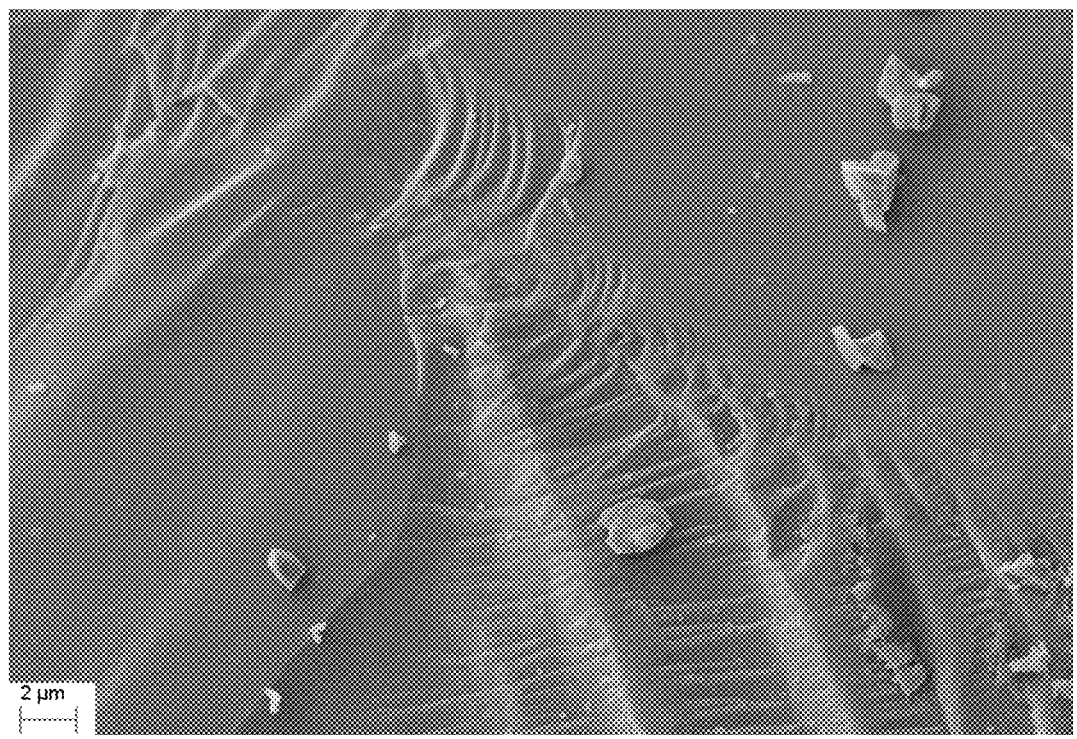
FIG. 2 is a scanning electron micrograph of a ceramic material according to an embodiment of the present disclosure.

The ceramic material of $Gd_{0.4}Yb_{1.6}Zr_2O_7$ is used as the thermal barrier coating. Thermal conductivity of the coating is decreased from 1.04 W/mK to 0.22 W/mK as a temperature increases from 400° C. to 1000° C. FIG. 1 shows the generation of the thermal barrier coating and FIG. 2 shows a scanning electron micrograph of the obtained $Gd_{0.4}Yb_{1.6}Zr_2O_7$ material.

EXAMPLE 2

Rare earth oxides $Er_2O_3$ and $Yb_2O_3$, and a Zr element oxide $ZrO_2$ were weighted respectively according to a molar ratio of (Er+Yb):Zr of 1:1 and a molar ratio of Er to Yb of 1:5, and mixed by high-energy ball-milling at a ball-milling speed of 400 rpm for 24 hours. Ethyl alcohol was used as a medium for the ball-milling. After the raw materials were mixed uniformly by the ball-milling, a raw material mixture powder was obtained. The mixture powder was dried in an oven at 80° C. and further milled. A granulation process was performed as follows. PVA was used as a binder solute and deionized water was used as a solvent to form an aqueous binder solution being of 6% of the binder by mass. The solution was divided into 3 parts, and separately added into the mixture powder. After 4-hour milling, the mixture powder was sieved via a 50 mesh screen. Then, the mixture powder was compacted by a hydraulic process at a pressure of 10 MPa for 10 s, and further applied on a substrate to form a layer. A laser was used to perform a pre-irradiation on the mixture powder to remove the binder and also remove the air bubbles from the layer. The laser pre-irradiation was performed at a power of 10 W, a spot diameter of 10 mm for 5 min. The mixture powder was uniformly covered on an aluminum alloy substrate and was further sintered with a laser having a laser wavelength of 980 nm, a laser sintering power of 80 W and a spot diameter of 10 mm. The mixture powder on the aluminum alloy substrate was sintered by the laser with a period of 10 s to activate a self-propagating high-temperature solid-phase reaction, thereby obtaining a ceramic material of $Er_{0.33}Yb_{1.67}Zr_2O_7$.

Figure 3:
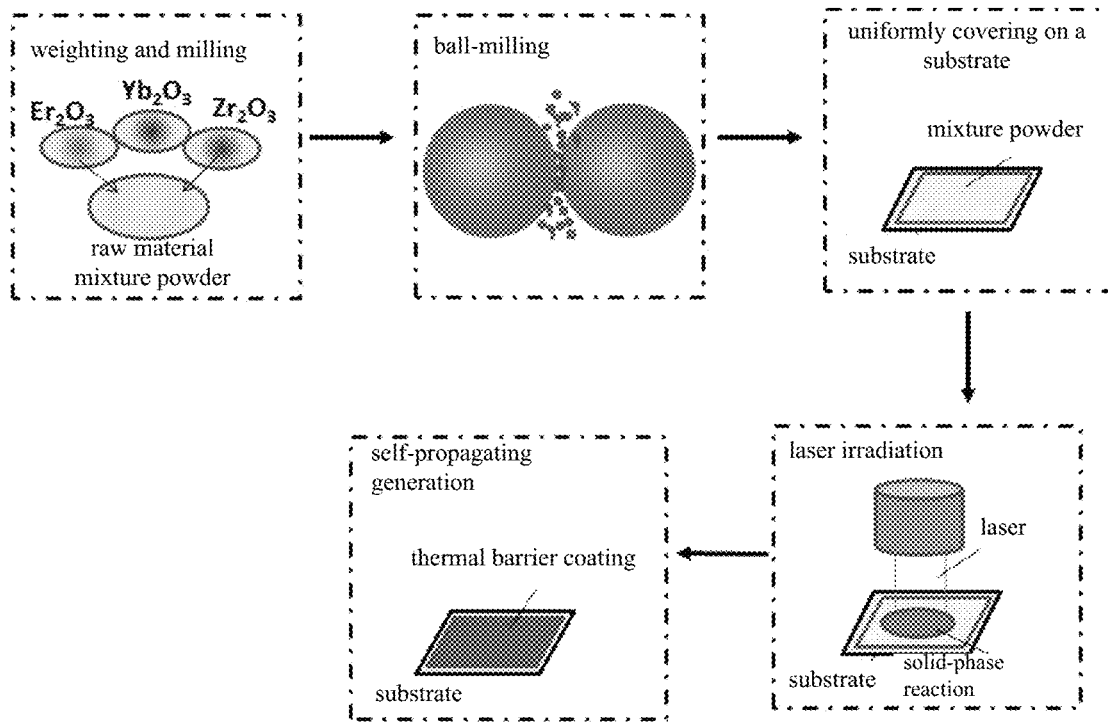
FIG. 3 is a flow chart showing generation of a ceramic material according to an embodiment of the present disclosure.

The ceramic material of $Er_{0.33}Yb_{1.67}Zr_2O_7$ is used as the thermal barrier coating. Thermal conductivity of the coating is decreased from 1.04 W/mK to 0.38 W/mK as a temperature increases from 400° C. to 1000° C. FIG. 3 shows operations of preparing the $Er_{0.33}Yb_{1.67}Zr_2O_7$ thermal barrier coating.

EXAMPLE 3

Rare earth oxide $Yb_2O_3$, and a Zr element oxide $ZrO_2$ were weighted respectively according to a molar ratio of Yb:Zr of 1:1. $SiO_2$ powder was weighted in a mass of 25% of the two oxides $Yb_2O_3$ and $ZrO_2$, and the three oxides were mixed by high-energy ball-milling at a ball-milling speed of 400 rpm for 24 hours. Ethyl alcohol was used as a medium for the ball-milling. After the raw materials were mixed uniformly by the ball-milling, a raw material mixture powder was obtained. The mixture powder was dried in an oven at 80° C. and further milled. A granulation process was performed as follows. PVA was used as a binder solute and deionized water was used as a solvent to form an aqueous binder solution being of 6% of the binder by mass. The solution was divided into 3 parts, and separately added into the mixture powder. After 4-hour milling, the mixture powder was sieved via a 50 mesh screen. Then, the mixture powder was compacted by an isostatic pressing process at an isostatic pressure of 150 MPa for 3 min, and further applied on a substrate to form a layer. A laser was used to perform a pre-irradiation on the mixture powder to remove the binder and also remove the air bubbles from the layer. The laser pre-irradiation was performed at a power of 15 W, a spot diameter of 10 mm for 5 min. The mixture powder was uniformly covered on an aluminum alloy substrate and was irradiated or sintered with a laser having a laser wavelength of 980 nm, a laser sintering power of 80 W and a spot diameter of 10 mm. The mixture powder on the aluminum alloy substrate was sintered by the laser with a period of 10 s to activate a self-propagating high-temperature solid-phase reaction, thereby obtaining a ceramic material of $SiO_2/Yb_2Zr_2O_7$.

The ceramic material of $SiO_2/Yb_2Zr_2O_7$ is used as the thermal barrier coating. Thermal conductivity of the coating is decreased from 1.04 W/mK to 0.30 W/mK as a temperature increases from 400° C. to 1000° C.

EXAMPLE 4

Rare earth oxides $Er_2O_3$ and $Yb_2O_3$, and a Zr element oxide $ZrO_2$ were weighted respectively according to a molar ratio of (Er+Yb):Zr of 1:1 and a molar ratio of Er to Yb of 1:5, and mixed by high-energy ball-milling at a ball-milling speed of 400 rpm for 24 hours. Ethyl alcohol was used as a medium for the ball-milling. After the raw materials were mixed uniformly by the ball-milling, a raw material mixture powder was obtained. The mixture powder was dried in an oven at 80° C. and further milled. The mixture powder was applied on a stainless steel substrate and was irradiated with a laser having a laser wavelength of 980 nm, a laser sintering power of 80 W and a spot diameter of 10 mm. The mixture powder on the aluminum alloy substrate was sintered by the laser with a period of 10 s to activate a self-propagating high-temperature solid-phase reaction, thereby obtaining a ceramic material of $Er_{0.33}Yb_{1.67}Zr_2O_7$.

Figure 4:
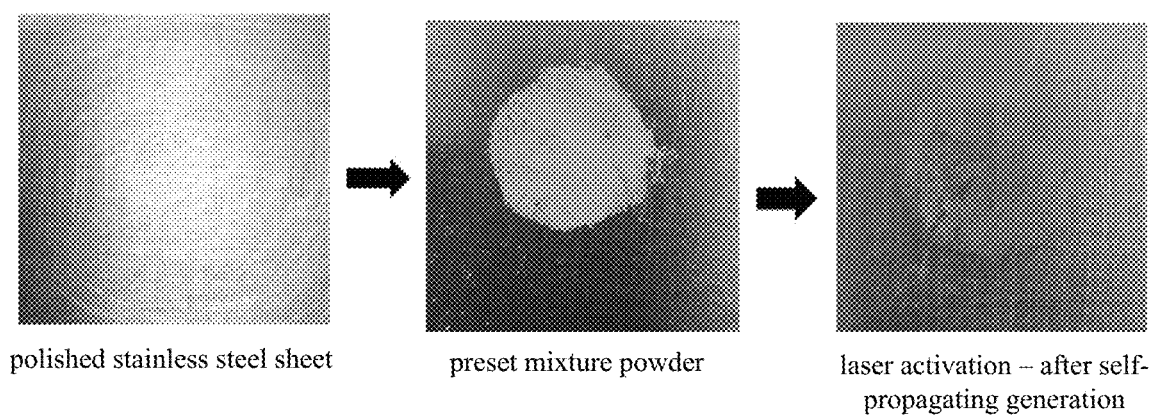
FIG. 4 is a photograph showing generation of a ceramic material on a stainless steel substrate according to an embodiment of the present disclosure.

The ceramic material of $Er_{0.33}Yb_{1.67}Zr_2O_7$ is used as the thermal barrier coating. Thermal conductivity of the coating is decreased from 1.04 W/mK to 0.50 W/mK as a temperature increases from 400° C. to 1000° C. FIG. 4 shows the generation of the $Er_{0.33}Yb_{1.67}Zr_2O_7$ thermal barrier coating on the stainless steel substrate.

EXAMPLE 5

Rare earth oxide $Yb_2O_3$, and a Zr element oxide $ZrO_2$ were weighted respectively according to a molar ratio of Yb:Zr of 1:1. LiF was weighted in a mass of 5% based on a total weight of the raw materials, and the three components were mixed in a zirconia ball-milling tank by high-energy ball-milling at a ball-milling speed of 400 rpm for 24 hours. Ethyl alcohol was used as a medium for the ball-milling. After the raw materials were mixed uniformly by the ball-milling, a raw material mixture powder having a diameter of 500 nm to 1 μm was obtained. The mixture powder was dried in an oven at 65° C. and further milled. A granulation process was performed as follows. PVA was used as a binder solute and deionized water was used as a solvent to form an aqueous binder solution being of 8% of the binder by mass. The solution was divided into 2 parts, and separately added into the mixture powder. After 5-hour milling, the mixture powder was sieved via a 500 mesh screen. Then, the mixture powder was compacted by a hydraulic process at a pressure of 2 MPa for 3 s, and transferred into a furnace to be heated to 500° C. at a heating rate of 5° C./min and kept at this temperature for 10 h to remove the binder and also remove the air bubbles. The mixture powder was cooled to the room temperature, and further milled. Then, the mixture powder was compacted by an isostatic pressing process at an isostatic pressure of 100 MPa for 3 min. After the mixture powder was placed in a copper crucible, it was sintered with a laser having a laser wavelength of 980 nm, a laser sintering power of 500 W and a spot diameter of 10 mm for 3 min and cooled to the room temperature, thereby obtaining a ceramic material of $LiF/Yb_2Zr_2O_7$.

Figure 5:
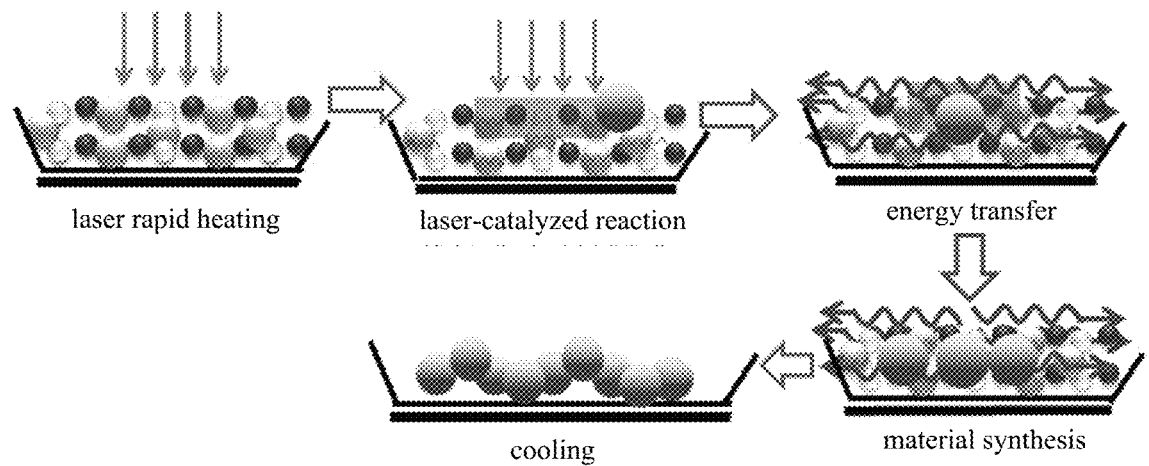
FIG. 5 is a schematic diagram showing a reaction principle of a ceramic material according to another embodiment of the present disclosure.

The ceramic material of $LiF/Yb_2Zr_2O_7$ is used as a transparent material which has a transmittance of 80% in a visible light range of 400 to 700 nm. FIG. 5 shows the generation of the transparent ceramic material.

EXAMPLE 6

Rare earth oxide $Yb_2O_3$, and a Zr element oxide $ZrO_2$ were weighted respectively according to a molar ratio of Yb:Zr of 1:1. LiF was weighted in a mass of 0.5% based on a total weight of the raw materials, and the three components were mixed in a zirconia ball-milling tank by high-energy ball-milling at a ball-milling speed of 400 rpm for 24 hours. Ethyl alcohol was used as a medium for the ball-milling. After the raw materials were mixed uniformly by the ball-milling, a raw material mixture powder having a diameter of 500 nm to 1 μm was obtained. The mixture powder was dried in an oven at 70° C. and further milled. A granulation process was performed as follows. PVA was used as a binder solute and deionized water was used as a solvent to form an aqueous binder solution being of 8% of the binder by mass. The solution was divided into 3 parts, and separately added into the mixture powder. After 5-hour milling, the mixture powder was sieved via a 500 mesh screen. Then, the mixture powder was compacted by a hydraulic process at a pressure of 3 MPa for 3 s, and transferred into a furnace to be heated to 500° C. at a heating rate of 5° C./min and kept at this temperature for 12 h to remove the binder and also remove the air bubbles. The mixture powder was cooled to the room temperature, and further milled. Then, the mixture powder was compacted by an isostatic pressing process at an isostatic pressure of 150 MPa for 5 min. After the mixture powder was placed in a copper crucible, it was sintered with a laser having a laser wavelength of 980 nm, a laser sintering power of 400 W and a spot diameter of 10 mm for 5 min and cooled to the room temperature, thereby obtaining a ceramic material of $LiF/Yb_2Zr_2O_7$.

Figure 6:
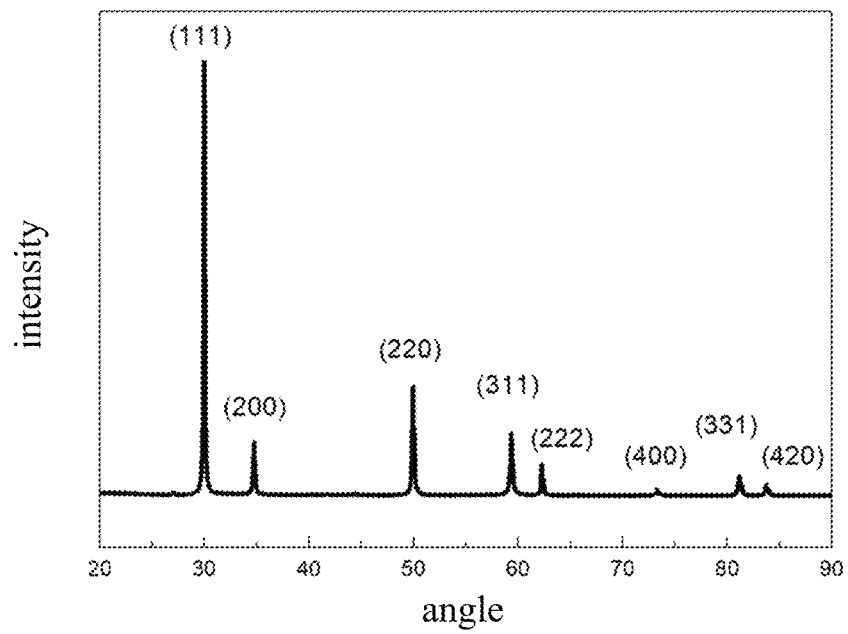
FIG. 6 is an X-ray diffraction diagram of a ceramic material according to an embodiment of the present disclosure.

The ceramic material of $LiF/Yb_2Zr_2O_7$ is used as a transparent material which has a transmittance of 85% in a visible light range of 400 to 700 nm. FIG. 6 shows an X-ray diffraction diagram of the ceramic material of $LiF/Yb_2Zr_2O_7$. Due to the low content of LiF, the diagram mainly shows diffraction peaks of $Yb_2Zr_2O_7$.

EXAMPLE 7

Rare earth oxide $Yb_2O_3$, and a Zr element oxide $ZrO_2$ were weighted respectively according to a molar ratio of Yb:Zr of 1:1, and were mixed in a zirconia ball-milling tank by high-energy ball-milling at a ball-milling speed of 400 rpm for 12 hours. Acetone was used as a medium for the ball-milling. After the raw materials were mixed uniformly by the ball-milling, a raw material mixture powder having a diameter of 500 nm to 1 μm was obtained. The mixture powder was dried in an oven at 75° C. and further milled. A granulation process was performed as follows. PVA was used as a binder solute and deionized water was used as a solvent to form an aqueous binder solution being of 7% of the binder by mass. The solution was divided into 3 parts, and separately added into the mixture powder. After 5-hour milling, the mixture powder was sieved via a 500 mesh screen. Then, the mixture powder was compacted by a hydraulic process at a pressure of 2 MPa for 3 s, and transferred into a furnace to be heated to 500° C. at a heating rate of 5° C./min and kept at this temperature for 12 h to remove the binder and also remove the air bubbles. The mixture powder was cooled to the room temperature, and further milled. Then, the mixture powder was compacted by the hydraulic process at a pressure of 15 MPa for 3 s. After the mixture powder was placed in a copper crucible, it was sintered with a laser having a laser wavelength of 980 nm, a laser sintering power of 200 W and a spot diameter of 10 mm for 3 min and cooled to the room temperature, thereby obtaining a ceramic material of $Yb_2Zr_2O_7$.

Figure 7:
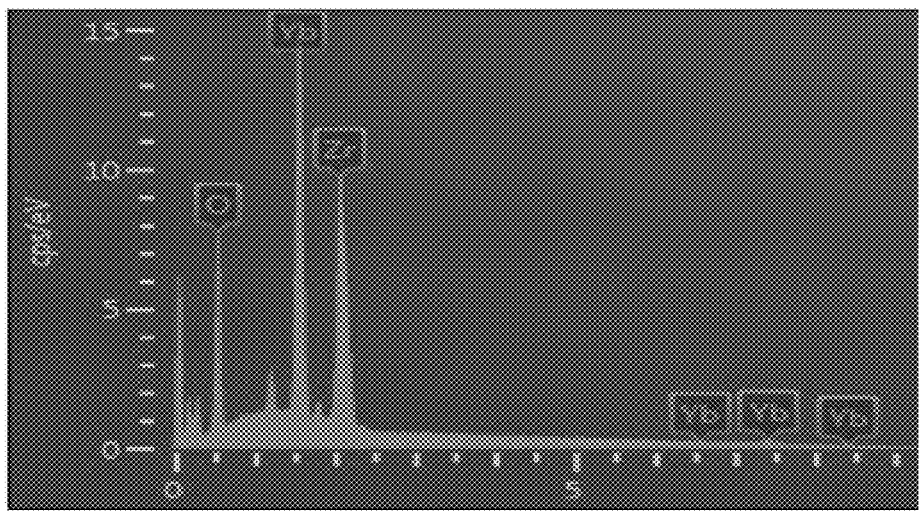
FIG. 7 is an EDX spectrogram of a ceramic material according to an embodiment of the present disclosure.

The ceramic material of $Yb_2Zr_2O_7$ is used as a transparent material which has a transmittance of 80% in a visible light range of 400 to 700 nm. FIG. 7 is an EDX spectrogram of the ceramic material of $Yb_2Zr_2O_7$.

EXAMPLE 8

Rare earth oxide $Yb_2O_3$, and a Zr element oxide $ZrO_2$ were weighted respectively according to a molar ratio of Yb:Zr of 1:1. LiF was weighted in a mass of 9% based on a total weight of the raw materials, and the three components were mixed in a zirconia ball-milling tank by high-energy ball-milling at a ball-milling speed of 400 rpm for 24 hours. Ethyl alcohol was used as a medium for the ball-milling. After the raw materials were mixed uniformly by the ball-milling, a raw material mixture powder having a diameter of 500 nm to 1 μm was obtained. The mixture powder was dried in an oven at 80° C. and further milled. A granulation process was performed as follows. PVA was used as a binder solute and deionized water was used as a solvent to form an aqueous binder solution being of 8% of the binder by mass. The solution was divided into 3 parts, and separately added into the mixture powder. After 5-hour milling, the mixture powder was sieved via a 500 mesh screen. Then, the mixture powder was compacted by a hydraulic process at a pressure of 3 MPa for 3 s, and transferred into a furnace to be heated to 500° C. at a heating rate of 5° C./min and kept at this temperature for 12 h to remove the binder and also remove the air bubbles. The mixture powder was cooled to the room temperature, and further milled. Then, the mixture powder was compacted by an isostatic pressing process at an isostatic pressure of 300 MPa for 10 min. After the mixture powder was placed in a copper crucible, it was sintered with a laser having a laser wavelength of 980 nm, a laser sintering power of 600 W and a spot diameter of 10 mm for 8 min and cooled to the room temperature, thereby obtaining a ceramic material of $LiF/Yb_2Zr_2O_7$.

Figure 8:
FIG. 8 is a photograph of a ceramic material according to an embodiment of the present disclosure.

The ceramic material of $LiF/Yb_2Zr_2O_7$ is used as a transparent material which has a transmittance of 85% in a visible light range of 400 to 700 nm. FIG. 8 shows a photograph of the transparent ceramic material obtained by the laser catalyzing and sintering.

EXAMPLE 9

Rare earth oxide $Yb_2O_3$, and a Zr element oxide $ZrO_2$ were weighted respectively according to a molar ratio of Yb:Zr of 1:4, and were mixed by high-energy ball-milling at a ball-milling speed of 400 rpm for 24 hours. Ethyl alcohol was used as a medium for the ball-milling. After the raw materials were mixed uniformly by the ball-milling, the mixture powder was dried in an oven at 80° C. and further milled. The mixture powder was compacted by a hydraulic machine at a pressure of 8 MPa for 5 s, and was placed in a copper crucible. The mixture powder was sintered with a laser having a laser wavelength of 980 nm, a laser sintering power of 300 W and a spot diameter of 10 mm for 8 min, to cause the high-temperature solid-phase reaction of the raw material mixture, thereby obtaining a ceramic material of $Yb_2Zr_8O_{19}$.

Figure 9:
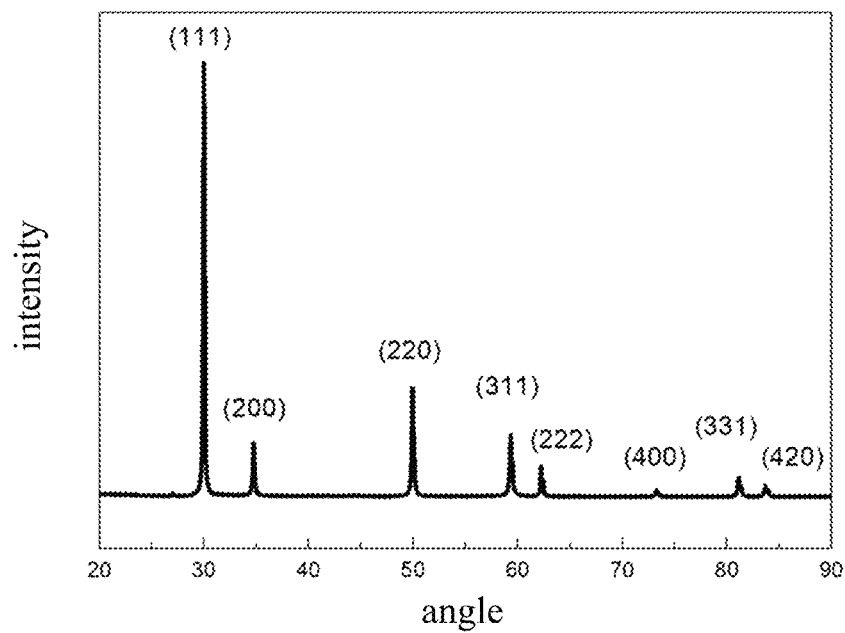
FIG. 9 is an X-ray diffraction diagram of a ceramic material according to another embodiment of the present disclosure.

The ceramic material of $Yb_2Zr_8O_{19}$ is stable at a relative high temperature such as a temperature of 1500 to 2000° C., and is used as a ceramic electrolyte. The ceramic material has a good insulating property and an ionic conductivity of $10^{-6}$ S/m. FIG. 9 is an X-ray diffraction diagram of the ceramic material of $Yb_2Zr_8O_{19}$.

EXAMPLE 10

Rare earth oxide $Yb_2O_3$, and a Zr element oxide $ZrO_2$ were weighted respectively according to a molar ratio of Yb:Zr of 1:4, and were mixed by high-energy ball-milling at a ball-milling speed of 400 rpm for 24 hours. Ethyl alcohol was used as a medium for the ball-milling. After the raw materials were mixed uniformly by the ball-milling, the mixture powder was dried in an oven at 70° C. and further milled. PVA was used as a binder solute and deionized water was used as a solvent to form an aqueous binder solution being of 8% of the binder by mass. The solution was divided into 3 parts, and separately added into the mixture powder. The mixture powder was compacted by a hydraulic machine at a pressure of 8 MPa for 10 s, and transferred into a furnace to be heated to 550° C. at a heating rate of 1° C./min and kept at this temperature for 12 h to remove the binder and also remove the air bubbles. The mixture powder was placed in a copper crucible. The mixture powder was sintered with a laser having a laser wavelength of 980 nm, a laser sintering power of 400 W and a spot diameter of 10 mm for 5 min, to cause the high-temperature solid-phase reaction of the raw material mixture, thereby obtaining a ceramic material of $Yb_2Zr_8O_{19}$.

The ceramic material of $Yb_2Zr_8O_{19}$ is stable at a relative high temperature such as a temperature of 1500 to 2000° C., and is used as a ceramic electrolyte. The ceramic material has a good insulating property and an ionic conductivity of $10^{-6}$ S/m.

EXAMPLE 11

Rare earth oxide $Yb_2O_3$, and a Zr element oxide $ZrO_2$ were weighted respectively according to a molar ratio of Yb:Zr of 1:4, and were mixed by high-energy ball-milling at a ball-milling speed of 400 rpm for 24 hours. Acetone was used as a medium for the ball-milling. After the raw materials were mixed uniformly by the ball-milling, the mixture powder was dried in an oven at 80° C. and further milled. PVA was used as a binder solute and deionized water was used as a solvent to form an aqueous binder solution being of 8% of the binder by mass. The solution was divided into 3 parts, and separately added into the mixture powder. The mixture powder was compacted by a hydraulic machine at a pressure of 10 MPa for 10 s, and irradiated at a laser power of 30 W, a spot diameter of 10 mm for 5 min to remove the binder and also remove the air bubbles. The mixture powder was placed in a copper crucible. The mixture powder was sintered with a laser having a laser wavelength of 980 nm, a laser sintering power of 500 W and a spot diameter of 10 mm for 3 min, to cause the high-temperature solid-phase reaction of the raw material mixture, thereby obtaining a ceramic material of $Yb_2Zr_8O_{19}$.

Figure 10:
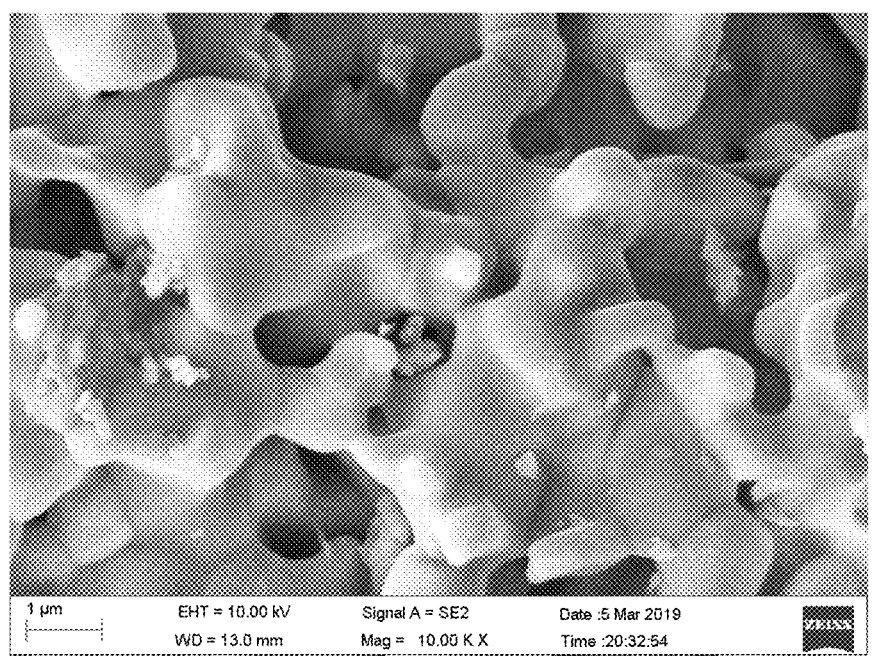
FIG. 10 is a scanning electron micrograph of a ceramic material according to another embodiment of the present disclosure.

The ceramic material of $Yb_2Zr_8O_{19}$ is stable at a relative high temperature such as a temperature of 1500 to 2000° C., and is used as a ceramic electrolyte. The ceramic material has a good insulating property and an ionic conductivity of $10^{-6}$ S/m. FIG. 10 is a scanning electron micrograph of the ceramic material of $Yb_2Zr_8O_{19}$.

EXAMPLE 12

Rare earth oxide $Yb_2O_3$, and a Zr element oxide $ZrO_2$ were weighted respectively according to a molar ratio of Yb:Zr of 1:4, and were mixed by high-energy ball-milling at a ball-milling speed of 400 rpm for 24 hours. Acetone was used as a medium for the ball-milling. After the raw materials were mixed uniformly by the ball-milling, the mixture powder was dried in an oven at 70° C. and further milled. The mixture powder was compacted by a hydraulic machine at a pressure of 10 MPa for 10 s. The mixture powder was placed in a copper crucible. The mixture powder was sintered with a laser having a laser wavelength of 980 nm, a laser sintering power of 600 W and a spot diameter of 10 mm for 5 min, to cause the high-temperature solid-phase reaction of the raw material mixture, thereby obtaining a ceramic material of $Yb_2Zr_8O_{19}$.

Figure 11:
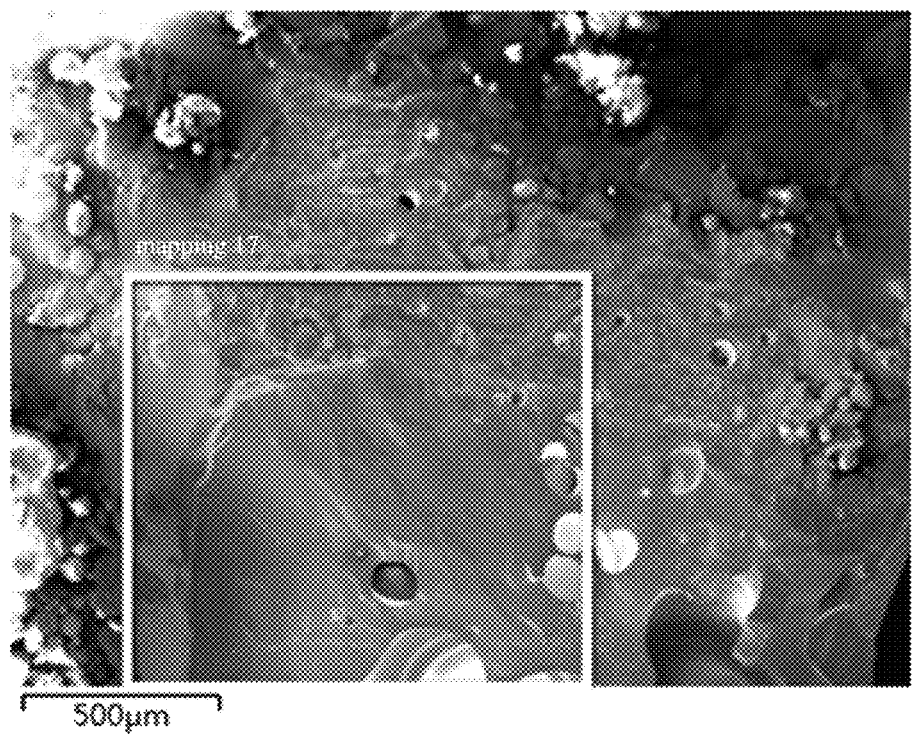
FIG. 11 is a scanning electron micrograph of a micro area selected when EDS is performed on a ceramic material according to an embodiment of the present disclosure.
Figure 12:
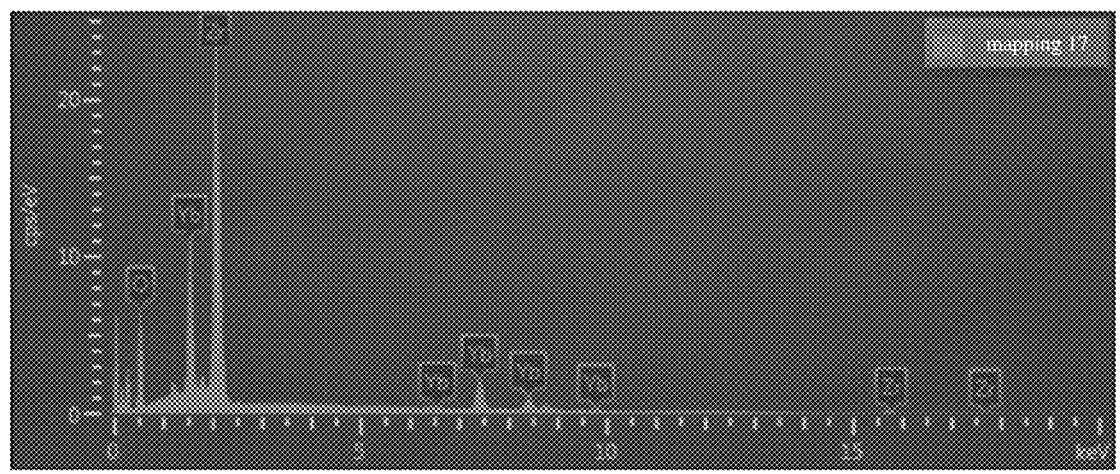
FIG. 12 is an EDS spectrogram of a ceramic material of the selected micro area of FIG. 11 according to an embodiment of the present disclosure.

The ceramic material of $Yb_2Zr_8O_{19}$ is stable at a relative high temperature such as a temperature of 1500 to 2000° C., and is used as a ceramic electrolyte. The ceramic material has a good insulating property and an ionic conductivity of $10^{-6}$ S/m. FIG. 11 is a scanning electron micrograph of a micro area selected when EDS is performed on the ceramic material of $Yb_2Zr_8O_{19}$, and FIG. 12 is an EDS spectrogram of the ceramic material of the selected micro area.

EXAMPLE 13

Rare earth oxide $Yb_2O_3$, and a Zr element oxide $ZrO_2$ were weighted respectively according to a molar ratio of Yb:Zr of 1:4, and were mixed by high-energy ball-milling at a ball-milling speed of 400 rpm for 24 hours. Acetone was used as a medium for the ball-milling. After the raw materials were mixed uniformly by the ball-milling, the mixture powder was dried in an oven at 70° C. and further milled. The mixture powder was compacted by a hydraulic machine at a pressure of 10 MPa for 10 s. The mixture powder was placed in a copper crucible. The mixture powder was sintered with a laser having a laser wavelength of 980 nm, a laser sintering power of 800 W and a spot diameter of 10 mm for 5 min, to cause the high-temperature solid-phase reaction of the raw material mixture, thereby obtaining a ceramic material of $Yb_2Zr_8O_{19}$.

Figure 13:
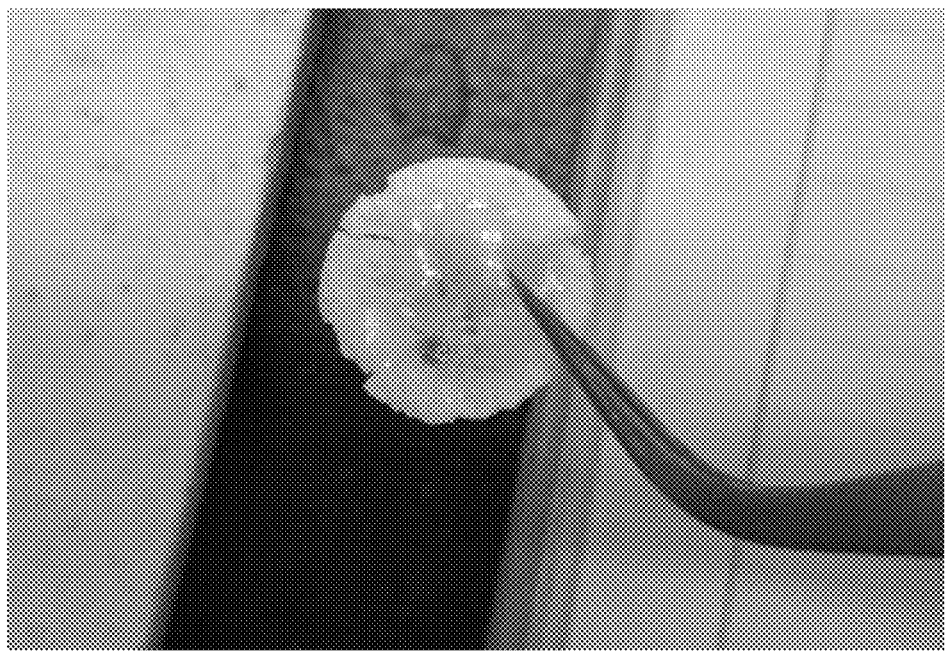
FIG. 13 is a photograph of a ceramic material according to another embodiment of the present disclosure.

The ceramic material of $Yb_2Zr_8O_{19}$ is stable at a relative high temperature such as a temperature of 1500 to 2000° C., and is used as a ceramic electrolyte. The ceramic material has a good insulating property and an ionic conductivity of $10^{-6}$ S/m. FIG. 13 is a photograph of the ceramic material of $Yb_2Zr_8O_{19}$.

In the specification, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, unless specified otherwise, "a plurality of" means two or more than two.

In the description, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples, without conflicting, may be combined by one skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for preparing a ceramic material comprising a compound of a formula of $A_2B_xO_y$, where A is at least one of Sc, Y, La, Nd, Eu, Gd, Dy, Er, Yb and Lu, B is at least one of Ti, Zr, Ce and Hf, $2 \le x \le 10$, $7 \le y \le 20$, and $0.7 \le y/x \le 3.5$, the method comprising:
   mixing a first oxide of $AO_m$ and a second oxide of $BO_n$ to obtain a mixture,
   ball-milling the mixture until a particle size of the mixture is not greater than 1 μm with a medium selected from a group consisting of ethanol, acetone, deionized water and a combination thereof, to obtain a powder,
   drying the powder at a temperature in a range of 60 to 80° C., and
   sintering the powder with a laser irradiation having a laser wavelength of 980 nm, an irradiation power ranging from 50 to 1500 W, a spot diameter ranging from 10 to 15 mm and an irradiation period of 3 s to 8 min to obtain the ceramic material.

2. The method according to claim 1, wherein the ball-milling is performed at a ball-milling speed of 400 rpm for a period ranging from 8 to 24 h.

3. The method according to claim 1, wherein after the powder is obtained, the method further comprises a granulation process comprising:
   preparing an aqueous binder solution being of 1 to 10% of a binder by mass,
   dividing the aqueous binder solution into 2 or 3 parts, adding the parts into the powder separately,
   milling for 3 to 6 h, and
   sieving with a 20 to 500 mesh screen.

4. The method according to claim 3, wherein the milling includes manual grinding or ball-milling.

5. The method according to claim 3, wherein the binder comprises at least one of polyvinyl alcohol, methoxysilane, polyurethane and silicone.

6. The method according to claim 3, wherein the method further comprises:

removing the binder by heating or laser irradiation.

7. The method according to claim 6, wherein the binder is removed by heating, and the heating is performed at a heating rate ranging from 1 to 5° C./min to a temperature in a range of 300 to 600° C., and the temperature is maintained for 10 to 24 h.

8. The method according to claim 6, wherein the binder is removed by laser irradiation, and the laser irradiation has a power not greater than 30 W, a spot diameter ranging from 10 to 15 mm and an irradiation period ranging from 5 to 20 min.

9. The method according to claim 1, wherein the method further comprises:
compacting the powder by a hydraulic process or an isostatic pressing process.

10. The method according to claim 9, wherein the powder is compacted by a hydraulic process, and the hydraulic process has a pressure ranging from 2 and 15 MPa and a compacting time ranging from 3 to 10 s.

11. The method according to claim 9, wherein the powder is compacted by an isostatic pressing process, and the isostatic pressing process has an isostatic pressure ranging from 100 to 300 MPa and a compacting time of 1 to 10 min.

12. The method according to claim 1, wherein a molar ratio of the first oxide of $AO_m$ to the second oxide of $BO_n$ is in a range of 1:1 to 1:5.

13. The method according to claim 1, wherein the ceramic material comprises a further compound different from the compound of the formula of $A_2B_xO_y$.

14. The method according to claim 13, wherein the further compound has a mass of 0.5 to 30 wt % based on a total weight of the first oxide of $AO_m$ and the second oxide of $BO_n$.

15. The method according to claim 13, wherein the further compound is $SiO_2$.

16. The method according to claim 13, wherein the further compound is LiF.

17. The method according to claim 1, wherein the powder has a diameter distribution in a range of 10 nm to 1 μm.

18. The method according to claim 1, wherein before the laser irradiation, the powder is applied on a substrate.

* * * * *